United States Patent [19]

Katsuta et al.

[11] E Patent Number: Re. 33,316

[45] Reissued Date of Patent: Aug. 28, 1990

[54] APPARATUS FOR CATALOGING AND RETRIEVING IMAGE DATA

[75] Inventors: Yuji Katsuta; Sumio Kita; Sakuharu Takano, all of Nara, Japan

[73] Assignee: Sharp Kabushiki Kaisha, Osaka, Japan

[21] Appl. No.: 377,122

[22] Filed: Jul. 10, 1989

Related U.S. Patent Documents

Reissue of:

[64] Patent No.: 4,829,453
Issued: May 9, 1989
Appl. No.: 21,963
Filed: Mar. 5, 1987

[30] Foreign Application Priority Data

Mar. 18, 1986 [JP] Japan ..... 61-61585
Mar. 18, 1986 [JP] Japan ..... 61-61586
Oct. 17, 1986 [JP] Japan ..... 61-247869

[51] Int. Cl.[5] ..... G06F 15/66
[52] U.S. Cl. ..... 364/521; 340/723; 340/731; 382/47; 382/56
[58] Field of Search ..... 364/518, 521; 358/260; 382/55, 61, 56, 47, 45; 340/723, 731

[56] References Cited

U.S. PATENT DOCUMENTS

| | | | |
|---|---|---|---|
| 4,020,463 | 4/1977 | Himmel | 382/55 |
| 4,455,554 | 6/1984 | Demke | 340/731 |
| 4,494,150 | 1/1985 | Brickman et al. | 358/260 |
| 4,503,427 | 3/1985 | Iida | 340/731 |
| 4,574,395 | 3/1986 | Kato | 382/61 |
| 4,586,156 | 4/1986 | Kurata et al. | 364/900 |
| 4,665,441 | 5/1987 | Sakaue et al. | 358/280 |
| 4,695,975 | 9/1987 | Bedrij | 364/900 |
| 4,723,298 | 2/1988 | Schiller | 382/56 |

*Primary Examiner*—David L. Clark
*Attorney, Agent, or Firm*—Flehr, Hohbach, Test, Albritton & Herbert

[57] ABSTRACT

An apparatus for cataloging and retrieving image data is programmed to store not only image data obtained by scanning each original but also reduced image data obtained by thinning these image data and search data used for the convenience in search operations. In a search operation, a plurality of reduced image data may be displayed simultaneously or sequentially with corresponding search data. Image data may be stored in a compressed form so that an increased amount of data can be stored. The apparatus may be programmed such that stored reduced image data are sequentially displayed while a specified key is depressed and particular image data corresponding to the data displayed when the key is released are displayed.

10 Claims, 3 Drawing Sheets

APPARATUS FOR CATALOGING AND RETRIEVING IMAGE DATA

Matter enclosed in heavy brackets [ ] appears in the original patent but forms no part of this reissue specification; matter printed in italics indicates the additions made by reissue.

BACKGROUND OF THE INVENTION

This invention relates to an apparatus for cataloging and retrieving image data obtained from original scannable documents (hereinafter simply referred to as originals) such as printed sheets of paper and drawings which have been converted into image signals.

Electronic files are becoming available as a practical device for managing documents and drawings which are now produced in large quantities. When originals such as documents are cataloged in an electronic file, they are converted into image data (hereinafter also referred to as primary data) and search data (hereinafter also referred to as secondary data) are attached to them for use when the primary data are retrieved. There are many situations, however, wherein secondary data alone cannot effectively identify the desired primary data and the primary data must be displaced eventually to enable the user to decide which data are being desired. Since the display of primary data takes several seconds, the procedure is time-consuming and cumbersome.

SUMMARY OF THE INVENTION

It is therefore an object of the present invention to provide an apparatus with which image data can be cataloged into and retrieved from an electronic file easily and efficiently.

In one aspect of the present invention, the above and other objects are achieved by providing the data cataloging and retrieving apparatus including a memory device for storing image data obtained by converting documents into image signals, search data for use when the image data are retrieved and reduced image data obtained by thinning the aforementioned image data and a display device for displaying within a unit time period a plurality of reduced image data. In another aspect of the present invention, the display device is adapted to display not only the aforementioned search data but also the reduced image data corresponding to the search data. The apparatus checks whether a certain specified key is being operated and, if it is, a display is made of the reduced image data stored in the memory device. When the key is released, the image data corresponding to the reduced image data then in display are retrieved from the memory device and displayed in the display device.

BRIEF DESCRIPTION OF THE DRAWINGS

The accompanying drawings, which are incorporated in and form a part of the specification, illustrate embodiments of the present invention and, together with the description, explain the principles of the invention. In the drawings.

DETAILED DESCRIPTION OF THE INVENTION

Figure 1:
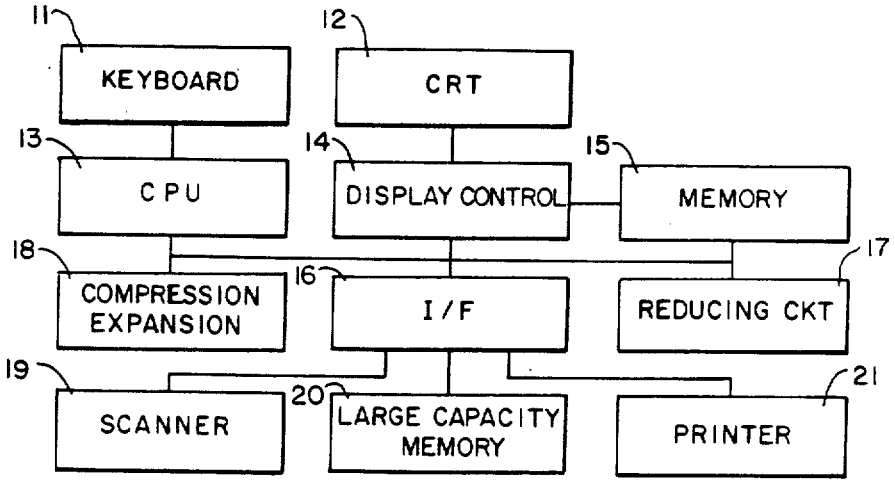
FIG. 1 is a block diagram showing the structure of an apparatus for cataloging retrieving image data embodying the present invention.

In FIG. 1 which is a block diagram for showing the structure of an apparatus embodying the present invention for cataloging and retrieving image data, Numeral 11 indicates a keyboard for entering search data (secondary data) such as titles and keywords and commands of all kinds such as a command to execute cataloging or a command to execute a special kind of search such as cover search or page search to be explained below. Numeral 12 indicates a cathode ray tube (CRT) for displaying image data (primary data) obtained by converting originals such as documents into image signals, the aforementioned search data (secondary data) and reduced image data (reduced primary data) obtained by thinning the aforementioned primary data. If its resolution is 1780 dots in the vertical direction and 1256 dots in the horizontal direction, for example, a full page of a document of size A4 can be displayed with the resolution of 6 lines/mm × 6 lines/mm. Numeral 13 indicates a central processing unit (CPU) which controls the entire operation of this apparatus including the cataloging and various types of searching. Numeral 14 indicates a display control circuit for controlling the data displays. Numeral 15 indicates an internal memory device for temporarily storing data. Numeral 16 indicates an interface circuit (IF). Numeral 17 indicates a reducing circuit which serves to generate the aforementioned reduced primary data by thinning primary data. Numeral 18 indicates a compression expansion circuit for compressing primary data and reduced primary data and expanding compressed data by a pre-determined procedure. Numeral 19 indicates a scanner for optically reading an original such as a document and converting it into image signals with resolution of 12 lines/mm × 12 lines/mm. Numeral 20 indicates a memory device with a large capacity for storing the aforementioned primary, secondary and reduced primary data. Numeral 21 indicates a printer for the output of primary data in response to an output command from the keyboard 11.

Figure 2:
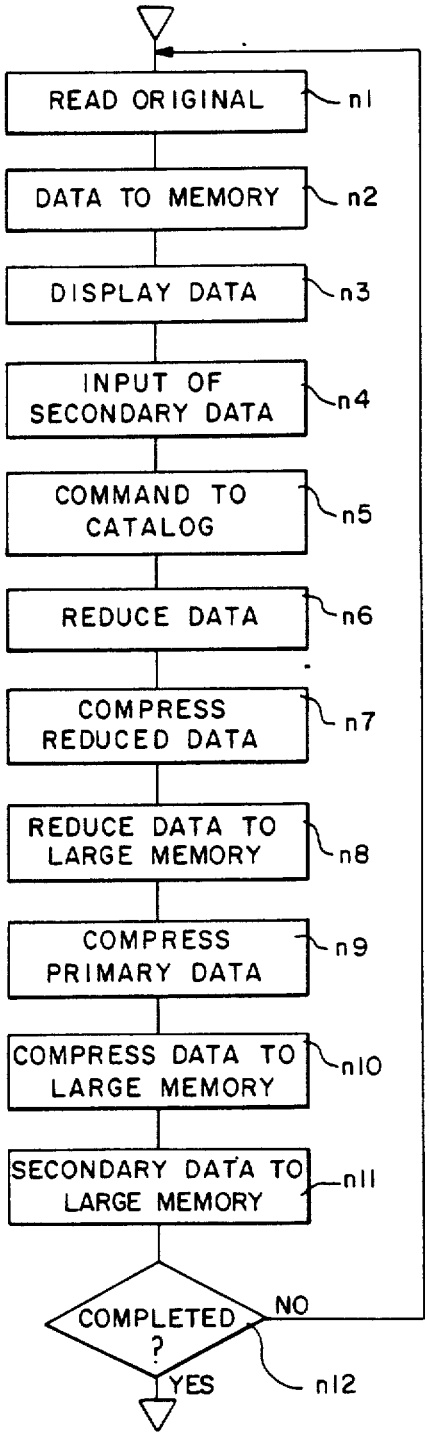
FIG. 2 is a flow chart showing the operation of the apparatus of FIG. 1 for cataloging data.

The procedure for cataloging an original such as a document into the apparatus described above is explained next by way of a flow chart shown in FIG. 2. When the original is read by the scanner 19 (n1), it is converted into image signals with resolution of 12 lines/mm × 12 lines/mm, and the primary data thus obtained becomes stored in the internal memory 15 through the interface circuit 16 (n2) and displayed on the CRT 12 (n3). At this moment, the CPU 13 transmits a command to the display control circuit 14 to display $\frac{1}{2} \times \frac{1}{2}$ of the primary data, (or data with resolution of 6 lines/mm × 6 lines/mm on the CRT 12). Next, secondary data comprised of a title, keywords, etc. corresponding to this primary data is entered from the keyboard (n4) and when a command to execute cataloging is entered (n5), the CPU 13 retrieves the primary data from the internal memory device 15 and causes it to be reduced to $\frac{1}{4} \times \frac{1}{4}$ by the reducing circuit 17, producing reduced primary data (n6) of resolution 3 lines/mm × 3 lines/mm. Thereafter, this reduced primary data is transmitted to the compression-expansion circuit 18 to be compressed (7) and this compressed reduced primary data is stored through the interface circuit 16 in an area hereinafter referred to as the reduced primary data storing area of the large-capacity memory device 20 (n8). Next, the CPU 13 reads the primary data again from the memory device 15 and, after sending it to the compression-expansion circuit 18 to have it compressed (n9), transmits it through the interface circuit 16 to the large-capacity memory device 20 to have it stored in another area thereof hereinafter referred to as the primary data storing area (n10). The CPU 13 transmits the secondary data received from the keyboard 11 to the large-capacity memory device 20 through the interface circuit 16 to have it recorded in still another area of the large-capacity memory device hereinafter referred to as the secondary data storing area (n11), thereby completing the cataloging process. If a plurality of primary data are to be cataloged (NO in n12), the steps from n1 to n11 are repeated and the large-capacity memory device 20 will be storing not only this plurality of primary data but also a plurality of reduced primary data and secondary data individually corresponding to the primary data.

Figure 3:
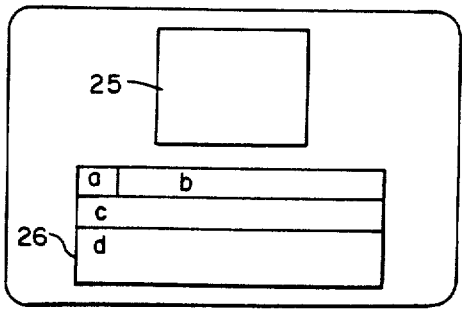
FIG. 3 is a schematic drawing of a display made during a search program.

Next, three search programs will be described by which the CPU 13 of FIG. 1 may be operated according to the present invention. According to a first search program, a start command received from the keyboard 11 causes the CPU 13 to transfer a plurality of reduced primary data from the large-capacity memory device 20 to the internal memory device 13, and after expanding these reduced primary data by the compression-expansion circuit 18, to display them on the CRT 12. In this situation, the CPU 13 transmits a command to the display control circuit 14 such that the reduced primary data are not thinned when they are displayed. The display is made in about $\frac{1}{2}\times\frac{1}{2}$ of the original size. This program is characterized in that the CRT 12 is caused to exhibit a plurality of reduced primary data sequentially within a unit time period such that the user is allowed to enter a stop command from the keyboard 11, upon detecting the desired reduced primary data during this sequential display of reduced primary data on the CRT 12. When the stop command is received, the CPU 13 causes the selected reduced primary data to be displayed continuously and also the secondary data corresponding to this selected primary data to be retrieved from the large-capacity memory device 20 and displayed. FIG. 3 shows schematically the display made in this situation in the CRT 12. Numeral 25 indicates the selected reduced primary data and numeral 26 indicates the corresponding secondary data including, for example, document number (a) data of cataloging (b), title (c) and one or more keywords (d). After checking the reduced primary data and secondary data thus displayed, the user enters from the keyboard 11 a primary data display command. When this command is received, the CPU 13 transfers from the large-capacity internal memory device 15 the primary data corresponding to the reduced primary data then in display and causes it to be displayed next on the CRT 12 after returning it to the original size by the compression-expansion circuit 18. At this time, the CPU 13 issues a command to the display control circuit 14 such that the primary data is displayed with resolution of 6 lines/mm×6 lines/mm. When an output command is thereafter received by the keyboard 11, the CPU 13 retrieves the primary data from the internal memory device 15 and has it printed by the printer 21. Since the data conversion speed inside the large-capacity memory device is slower than the speed of the data transmission between the internal memory device 15 and the compression-expansion circuit 18, a display can be made faster if the data are compressed and expanded.

By this search program, in summary, a plurality of reduced image data corresponding individually to the image data of the originals are sequentially displayed within a unit time such that the user can make a search easily as if thumbing through the pages of a book and the time required for a search can be significantly reduced. Moreover, since image data are stored after they are reduced in size, it is equivalent to having a memory device with an increased capacity.

Figure 4:
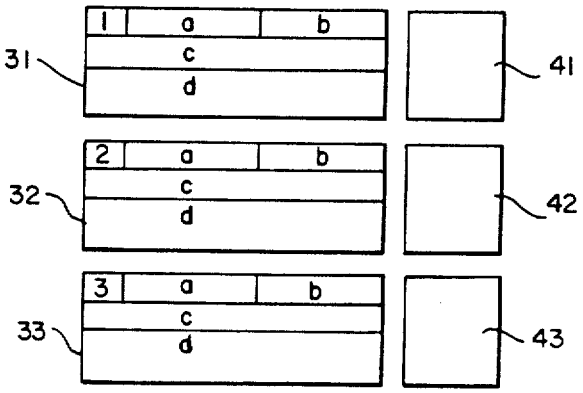
FIG. 4 is a schematic drawing of a display made during another search program.

According to a second search program, both a search condition and a command to execute a search are entered from the keyboard 11. When this is done, the CPU 13 retrieves secondary data sequentially and reduced primary data satisfying the search condition from the large-capacity memory device 20 and causes the plurality of secondary data and reduced primary data thus retrieved not only to be stored at specified areas in the internal memory device 13 but also to be displayed on the CRT 12. FIG. 4 shows schematically the display thus ade on the CRT 12. Numerals 31, 32 and 33 indicate a plurality of secondary data and 41, 42 and 43 indicate reduced primary data corresponding to the secondary data 32 and 33, respectively. In the memory device 15, the data are stored in areas in one-to-one correspondence with the display pattern. When the CPU 13 transmits a command to the display control circuit 14, a display is made on the CRT 12 in a pattern which is one-to-one correspondence with this memory patter in the memory device 15. The reduced primary data, 41, 42 and 43 are displayed in about $\frac{1}{4}\times\frac{1}{4}$ of the actual size. Letters relating to the secondary data 31, 32 and 33 indicate the items explained above in connection with FIG. 3. Upon reviewing the reduced primary data and secondary data displayed on the CRT 12, the user enters through the keyboard 11 the number on the upper left-hand corner of the secondary data corresponding to the desired reduced primary data. Thereupon, the CPU 13 transfers the primary data corresponding to the selected secondary data and causes this primary data to be displayed on the CRT 12. If an output command is further entered from the keyboard 11, the CPU 13 causes the primary data in the memory device 15 to be printed by the printer 21. This search program is thus characterized in that a search is carried out both by the keyword, etc. and by the image and hence is easier to carry out. Since a plurality of reduced primary data are displayed simultaneously, furthermore, the search can be carried out faster. It is to be noted that the compression-expansion circuit 18 is not required according to this search program.

Figure 5:
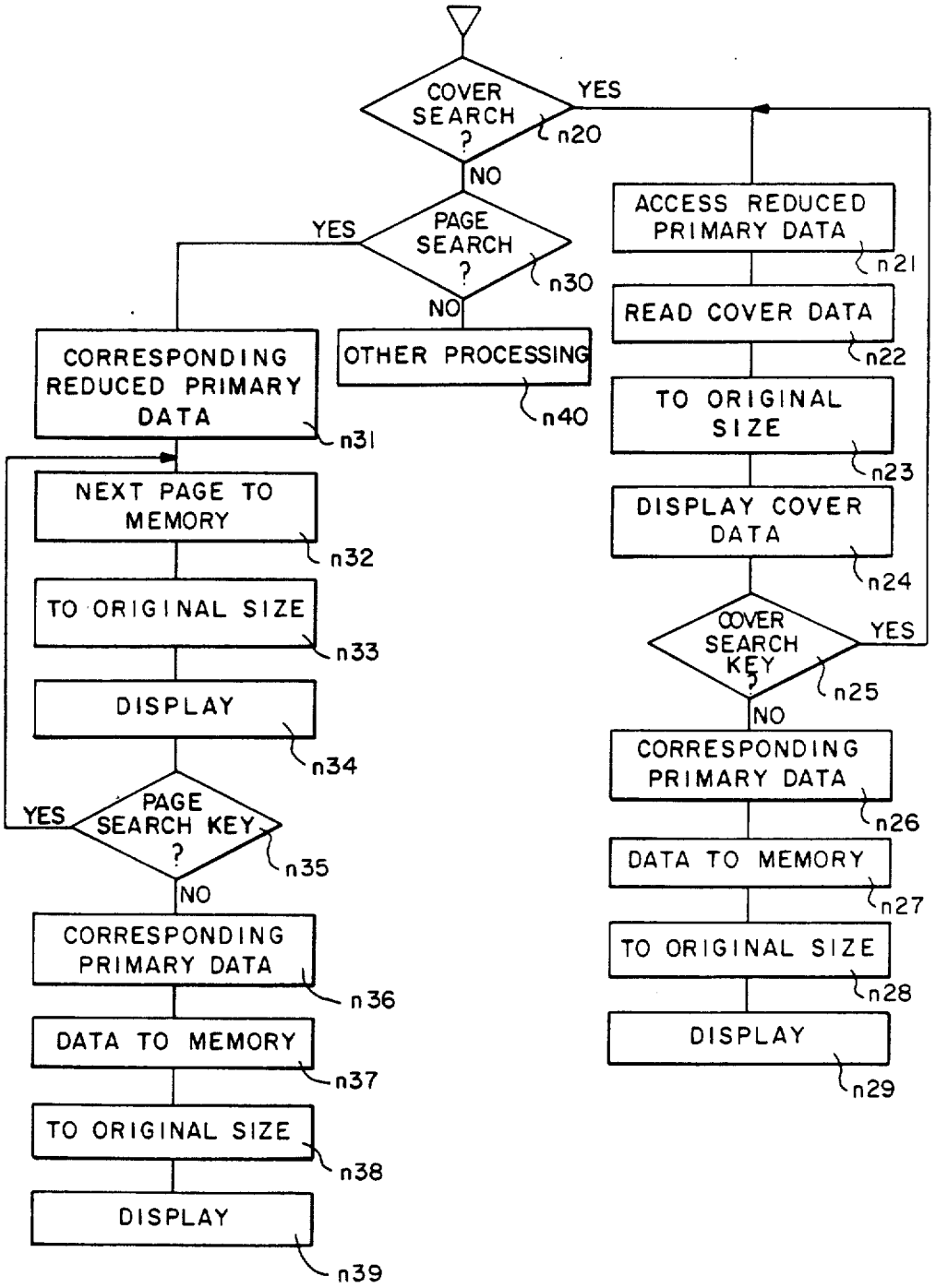
FIG. 5 is a flow chart of a search program which may be performed with an apparatus shown in FIG. 1.

Next, a third search program embodying the present invention is described by way of a flow chart in FIG. 5. With this search program, the keyboard 11 is provided with a cover (first page) search key and a page search key. If the CPU 13 detects that the cover search key is being operated (YES in n20), the aforementioned primary data storing area of the large-capacity memory device is accessed (n21) and only the data relating to the covers (first pages) of the reduced primary data are sequentially retrieved. The cover data may include in the secondary data storing area, for example, the starting address of each reduced primary data of the reduced primary data storing area as a piece of search data such that retrieval may be effected by sequentially searching only the cover data and referencing the search data. The cover data from the large-capacity memory device 20 are temporarily stored (n22) in the memory device 15 and thereafter transmitted to the compression-expansion circuit 18 so that the original data are obtained again (n23). Next, the CPU 13 transmits a command to the display control circuit 14 and the display control circuit 14 thereupon enlarges the cover data composed of reduced primary data of size $\frac{1}{4}\times\frac{1}{4}$ to the size of $\frac{1}{2}\times\frac{1}{2}$ and displays them on the CRT 12 (n24).

In summary, the reduced primary data are used and only the cover data of the individual reduced primary data showing the first pages of the original documents are sequentially displayed on the CRT 12, and this continues as long as the aforementioned cover key is operated (YES in n25). The user can thus select the desired image data by reviewing these cover data sequentially displayed on the CRT 12. Since the reduced primary data are used for this process, the amount of data used for this process is small and many first pages can be reviewed. In short, a speedy search is made possible.

When the user releases the cover search key (NO in n25), the CPU 13 interprets this as the indication that the user has indicated the desire data and retrieves from the primary data storing data of the large-capacity memory device 20 the particular primary data corresponding to the cover data which was being displayed on the CRT 12 when the user released the cover search key (n26). This retrieval is effected, for example, on the basis of its starting address or the starting address of the corresponding reduced primary data which is stored in the secondary data storing area.

The corresponding primary data thus retrieved from the large-capacity memory device 20 is transmitted first to the memory device 15 (n27) and then to the compression-expansion circuit 18 which restores the original data (n28), and the CPU 13 then transmits a command to the display control circuit 14 such that the primary data of resolution 12 lines/mm×2 lines/mm is reduced to $\frac{1}{2}\times 178$ and displayed on the CRT (n29).

If the page search key, instead of the cover search key, is pressed on the keyboard 11 (YES in n30), the CPU 13 retrieves the reduced primary data corresponding to the primary data currently in display on the CRT 12 (n31) and transmits to the memory device 15 the reduced primary data of the page immediately following the one currently being displayed on the CRT 12 (n32). The data sent to the memory device 15 are sent to the compression-expansion circuit 18 which retores the original data (n33) and the CPU 13 then transmits a command to the display control circuit 14 such that the page data comprising reduced primary data of size $\frac{1}{4}\times\frac{1}{4}$ are enlarged to the size of $\frac{1}{2}\times\frac{1}{2}$ and are displayed on the CRT 12 (n34). Steps from n32 to n34 are repeated sequentially as long as the page search key is pressed (YES in n35).

When the user releases the page search key (NO in n35), the CPU 13 interprets this as the indication that the user has selected the page in display in the CRT 12 at the time of the release and retrieves from the primary data storing area of the large-capacity memory device 20 the primary data corresponding to the selected page data (n36). The corresponding primary data thus retrieved is transmitted first to the memory device 15 (n37) and then to the compression-expansion circuit 18 which restores the original size (n38) The CPU 13 then transmits a command to the display control circuit 14 such that the primary data of resolution 12 lines/mm×12 lines/mm is reduced to $\frac{1}{2}\times\frac{1}{2}$ and displayed on the CRT 12 (n39). It goes without saying that if neither of the search keys is operated (NO in n20 and n30), the CPU 13 will control operations of other types (n40).

With the CPU 13 of FIG. 1 thus programmed, the search can be effected efficiently by means of reduced image data because the user has only to press the search key to have displays made sequentially and to release the key to select the desired data.

The foregoing description of preferred embodiments of the invention has been presented for purposes of illustration and description, it is not intended to be exhaustive or to limit the invention to the precise form. Modifications and variations which may be apparent to a person skilled in the art are intended to be included in the scope of this invention.

What is claimed is:

1. An apparatus for cataloging and retrieving image data obtained by converting scannable documents into image signals, comprising memory means for storing image data, search data for searching image data stored in said memory means and reduced image data obtainable by thinning image data stored in said memory means, display means, input means including a search key which can be operated and released for entering a search command, and control means programmed to check whether said search key is operated, to sequentially display on said display means reduced image data from said memory means while said search key is operated, and to display particular image data from said memory means when said search key is released, said particular image data corresponding to the reduced image data being displayed on said display means when said search key is released.

2. The apparatus of claim [8] *1* wherein said control means is also programmed to sequentially display on said display means a plurality of reduced image data stored in said memory means each for a unit time period.

3. The apparatus of claim 1 further comprising compression-expansion means for compressing image data and reduced image data which are written in said memory means and expanding compressed image data and compressed reduced image data compressed by said compression expansion means.

4. The apparatus of claim 1 further comprising a scanner means, said control means being further programmed to catalog a scannable document by obtaining image data from image signals obtained by scanning said scannable document by said scanner means, generating reduced image data by thinning said image data, receiving search data related to said scannable document, and causing said reduced image data and said obtained image data to be compressed by a compression-expansion circuit.

5. The apparatus of claim 1 wherein said control means is further programmed to expand image data from said memory means.

6. The apparatus of claim 1 wherein said control means is also programmed to display on said display means both search data stored in said memory means and reduced image data corresponding to said search data.

7. The apparatus of claim 6 wherein said control means is programmed to simultaneously display on said display means a plurality of said search data and a plurality of said reduced image data.

8. The apparatus of claim 6 further comprising a scanner means, said control means being further programmed to catalog a scannable document by obtaining image data from image signals obtained by scanning said scannable document by said scanner means, generating reduced image data by thinning said image data, and receiving search data related to said scannable document.

9. The apparatus of claim 1 further comprising a scanner means, said control means being further programmed to catalog a scannable document by obtaining image data from image signals obtained by scanning said sacnnable document, generating reduced image data by thinning said image data, receiving through said input means search data related to said scannable document, and causing said reduced image data and said obtained image data to be compressed by transmitting to a compression expansion circuit.

10. The apparatus of claim 1 wherein said control means is further programmed to expand image data from said memory means.

* * * * *